Figure 1:
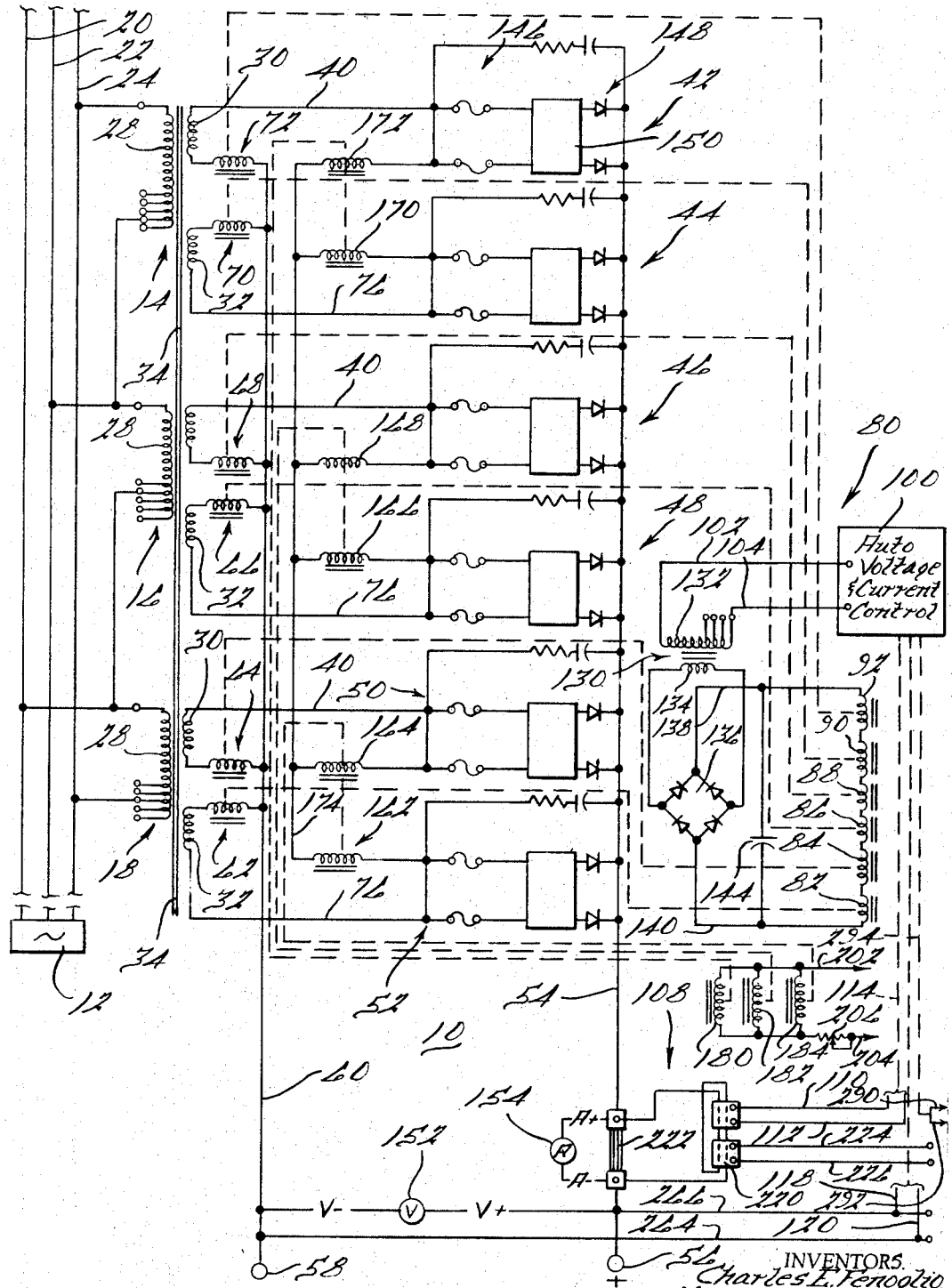

March 19, 1968  C. E. FENOGLIO ET AL  3,374,427
MAGNETIC AMPLIFIER VOLTAGE REGULATOR WITH PRELOAD SYSTEM
Filed March 4, 1966  2 Sheets-Sheet 1

INVENTORS.
Charles E. Fenoglio
Michael A. Kottumak
BY Harness, Dickey & Pierce
ATTORNEYS.

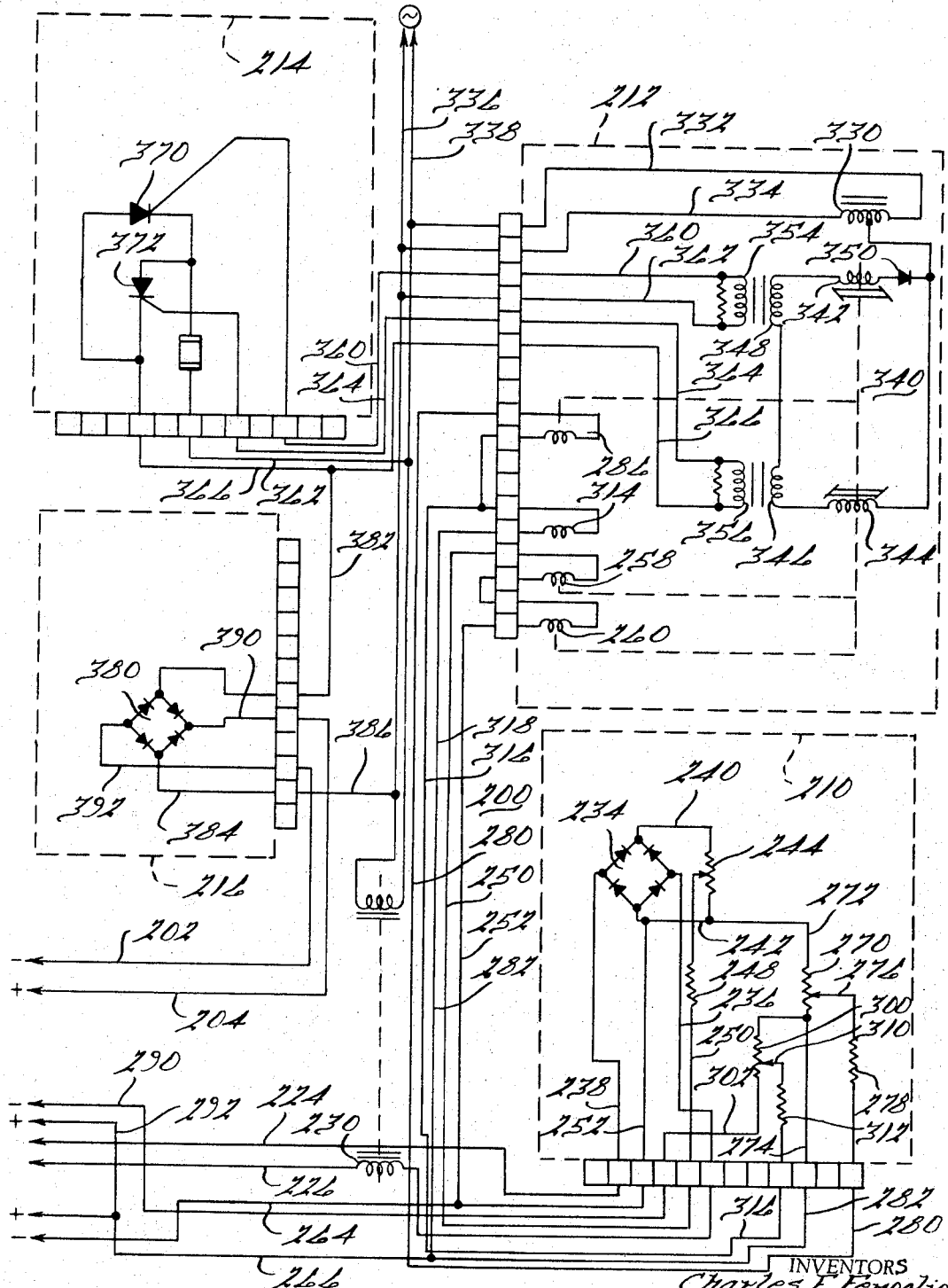

United States Patent Office 3,374,427
Patented Mar. 19, 1968

3,374,427
MAGNETIC AMPLIFIER VOLTAGE REGULATOR WITH PRELOAD SYSTEM
Charles E. Fenoglio, Detroit, and Michael A. Koltuniak, Warren, Mich., assignors to The Udylite Corporation, Warren, Mich., a corporation of Delaware
Filed Mar. 4, 1966, Ser. No. 531,857
10 Claims. (Cl. 323—89)

This invention relates generally to control systems, and more particularly to an improved circuit for preloading a saturable reactor utilized to effect control of electrical energy being transferred from a source to a load.

Saturable reactors are often used for the control of, for example, electrical energy between a source and a load wherein it is desired that the control system contain a minimum number of moving parts and be relatively dependable in operation. Such saturable reactors generally comprise an alternating current or controlled main winding and a direct current or control winding in magnetic association therewith on a common magnetic core. The DC control winding of the saturable reactor produces a variable or fixed, depending on the operation of the reactor, flux in the magnetic core thereby varying the effective permeability of the core, and hence the reactance of the controlled winding. With a rise or fall in the reactance of the controlled winding, the electrical energy being delivered to the load drops or rises, respectively, thereby controlling the amount of energy being fed to the load.

However, saturable reactors have been found to be relatively uncontrollable when the load thereon, or on the device being controlled by the saturable reactor, is reduced below for example, ten percent of the rated capacity of a saturable reactor. This problem has been heretofore solved in saturable reactor control circuits where such loss of control is undesirable, by placing a shunt load on the reactor. This shunt load may take the form of, for example, a resistance load connected in parallel with the output of the saturable reactor. However, the loss of power in dissipated heat incident to the use of such load resistors is appreciable when the power supply controlled by the reactor is operated in the controllable range and even greater at rated capacity.

Accordingly, some form of switching device is generally employed to remove the load resistors from the power supply circuit when the load on the reactor is greater than, for example, ten percent of rated capacity. However, the use of such a switching mechanism renders the power supply relatively susceptible to mechanical and electrical failure, and accordingly is undesirable.

In certain situations, a primary control system is utilized wherein a primary reactor is provided on the source side of the main power transformer, in lieu of on the load side. While this form of preloading has proved successful, it is relatively expensive in use due to the fact that certain requirements on the electrical characteristics of the primary side of the transformer are greater than those encountered on the secondary side. For example, the core must be greater thereby introducing greater cost for the system.

The saturable reactor preloading circuit, in accordance with an exemplary embodiment of the instant invention, obviates the need for load resistors and their associated switching mechanisms as well as eliminating certain problems encountered in the use of primary reactors. The control circuit of the instant invention utilizes a preload reactor in shunt with the main reactor on the secondary side of the main power transformer, and a plurality of load conditions, including a reference condition are sensed and utilized concurrently to control the operation of the preload reactor. The reactor generally includes a preload winding in shunt with the main reactor winding and a DC control winding on the core thereof to effect a predetermined degree of saturation of the core at such time as the load circuit becomes insufficiently loaded, thereby producing sufficient excitation flow in the main reactor winding.

It has further been found that the secondary preload circuit of the control circuit of the present invention obviates the need for a bias winding in the main reactor circuit as has been heretofore thought necessary. The bias current, normally produced by the bias winding, is produced in a system embodying the present invention by the preload circuit as will be more fully explained hereinafter.

By way of example, in supplying electrical energy to an electrochemical processing syestem, it has been the practice to supply the bath with voltages of varying levels as the work progresses through the bath, as for example supplying an entry or prestrike, strike and plating voltages. Upon initially entering the bath and during the period when the workpieces are out of the electroplating bath, the load terminals of the rectifier are open circuited, thereby drawing little or no load current from the output transformer. Thus, the saturable reactor being utilized to control the output voltage of the system is not effective to lower the voltage to the desired entry or prestrike voltage.

In this situation, the workpieces enter the electroplating bath at the full voltage level of the rectifier, this voltage being higher than that which is normally desired. As the work is lowered into the bath and prior to drawing a substantial amount of load current (prior to achieving control of the rectifier), a high voltage as compared to the submerged area exits at the tips of the work, resulting in the burning of the tips as they are immersed. This condition exists until sufficient work area has been immersed into the electroplating bath to draw sufficient current through the load terminals, thus enabling the saturable reactor to gain control of the load voltage. An identical situation exists as the workpieces are being withdrawn from the bath on completion of the electroplating operations thereof. That is, the last portion of the work to be withdrawn will draw an extremely large current per unit area due to the full voltage condition of the rectifier. However, this latter current density results in a low total current due to the relatively small area.

Accordingly, one object of the present invention is to provide an improved preloading circuit for a saturable reactor.

Another object of the present invention is to provide an improved preloading circuit for a saturable reactor that automatically increases the preload on the reactor to a predetermined level, upon a decrease in normal operating loads below a predetermined level, the increase occurring in accordance with certain preselected conditions existing in the load circuit.

Still another object of the present invention is to provide an improved preloading circuit for a saturable reactor which automatically decreases the preload on the reactor when the load on the reactor increases above a predetermined level in accordance with the preselected conditions.

It is still another object of the present invention to provide an improved control circuit for a saturable reactor wherein a plurality of control circuit and load characteristics are sensed and utilized in a novel coacting manner to achieve control of the preload system.

It is still a further object of the present invention to provide an improved control system for a preload saturable reactor which is simple in construction, and efficient and reliable in operation.

Further objects, features and advantages of this invention will become apparent from a consideration of the following description, the appended claims and the accompanying drawings in which:

FIGURE 1 is a schematic diagram of a main control circuit, which may be utilized in conjunction with an electrochemical processing apparatus, and particularly illustrating the main windings of the preload reactor and certain sensing circuits for providing control signals to a preload control circuit being utilized to effect the operation of the preload circuit; and FIGURE 2 is a schematic diagram illustrating the various control circuits being utilized in controlling the energization of the control windings for the preload reactor in response to certain conditions being sensed in the control circuit and the load.

Referring now to FIGURE 1 of the drawing, there is illustrated a power supply circuit 10 including a source 12 of alternating current potential, which is generally of the three-phase, sixty-cycle configuration. The source 12 may be fed through a suitable main disconnect switch (not shown). The three-phase source 12 is fed to a plurality of input transformers 14, 16 and 18 from the three-phase input conductors 20, 22, 24. The input transformers generally comprise a variably tapped primary winding 28 which is magnetically coupled with a pair of secondary windings 30, 32 through a magnetic core 34. The secondary winding 30, 32 is connected in a split secondary configuration wherein each of the upper halves 30 of the secondary winding is connected to conduct current from the bottom of the winding to the top of the winding and each of the lower portions 32 are connected to conduct current from the top of the winding to the bottom of the winding due to the rectifying connections. The secondary current is fed through a conductor 40, a plurality of fuse-rectifier combinations 42 to 52, to a positive bus 54.

The circuit is completed through the load connected to a positive and negative output terminal 56 and 58, a negative bus 60 and a plurality of main reactor windings 62 to 72 back to the respective sides of the secondary windings 30, 32. Thus, for one-half cycle, current will flow through secondary windings 30, conductor 40, through the fuse-diode combination 42, the positive bus 54, the load (not shown), the negative bus 60, and the main control reactor 72, back to the terminal 30. On the opposite half-cycle current flows from the secondary winding 32 through a conductor 76 through the fuse-diode combination 44, the positive bus 54, the load, the negative bus 60, the main control reactor 70 back to the secondary winding 32.

The main control saturable reactor impedance is controlled, as is common in the art, by means of a reactor control winding circuit 80 which is magnetically coupled to each of the main control windings 62 to 72 by means of a plurality of control windings 82 to 92. As is well known, the degree of current flow through the windings 82 to 92 controls the degree of saturation of the cores of main reactor 62 to 72, thereby controlling the amount of current flowing to the load from the transformers 14, 16 and 18. The current flowing through the main reactor control windings 82 to 92 is controlled by means of an automatic voltage and current control circuit 100 which provides a control current on output conductors 102 and 104 in response to certain conditions sensed in the load circuit, as for example, voltage and current levels.

The load current is sensed by means of a transductor circuit 108 which provides an output signal on a pair of output conductors 110 and 112, the signal being fed to the automatic voltage and current control circuit 100 by means of a cable 114. Similarly, the voltage at the output termnials 56 and 58 are sensed and fed to the automatic voltage and current control circuit 100 by means of conductors 118 and 120 and the cable connected thereto. The automatic voltage and current control circuit may take any configuration known in the art wherein the operator may preset voltage and current conditions at the load and maintain these conditions during the operation of the circuit 10.

The current flowing through output conductors 102 and 104 is fed to a transformer 130 having a primary winding 132 and a secondary winding 134. The secondary winding 134 is connected to a bridge circuit 136 and the output terminals thereof are connected to a pair of output conductors 138 and 140 which are connected to opposite ends of a series combination of the control windings 82 to 92. A suitable filter capacitor 144 is provided across the output terminals of the rectifier bridge 136, as is common in the art.

The main control circuit 10 includes a plurality of rectifying circuits 42 to 52, as was described above, which include a plurality of fuse circuits 146 and a plurality of diodes 148 comprising several individual diodes connected in parallel for each leg of the output circuit. Also a means 150 for balancing the current flow through the diodes is included in the circuit and may take any form, as for example, a magnetic coupling circuit which magnetically couples the legs of the diode to force current balance in the diode legs. Also the circuit 150 may take the form of an individual resistor interconnected in series in each diode leg to minimize the current unbalance in each leg. These forms are common and well known in the art and need no further explanation herein. Also a suitable voltage sensing circuit in the form of a voltmeter 152 and a current sensing circuit in the form of an ammeter 154 may be provided to provide the operator with a visual representation of the voltage and current flowing in the circuit.

As was stated above, the control circuit 10 has been provided with a preload circuit which includes a plurality of main preload windings 162 to 172 which are connected in shunt circuit relation with each of the main reactor windings 62 to 72 by means of a conductor 174. Accordingly, a shunt path is provided from each of the lower main reactor windings, as for example, winding 62, through the lower secondary winding 32, the conductor 76, the main preload reactor winding 162, the conductor 174, a main preload reactor winding 164, the conductor 40, the secondary winding 30 and the upper main reactor winding 64.

Accordingly, a complete current path loop is provided wherein preload current may flow through the circuit just described in accordance with the amount of impedance presented by the preload reactor windings 162 and 164. The reactance of the main preload reactor windings 162 to 172 is controlled by a plurality of preload control windings 180, 182 and 184 wherein the amount of current flowing through the control windings 180, 182, 184 controls the impedance of the main preload windings 162 to 172 in accordance with well known principles. For example, if a large amount of current is flowing through the control windings 180, 182, 184, the impedance of main preload windings 162 to 172 will be decreased thereby providing a substantial current path through the windings 162 to 172.

In view of the fact that it is a practical impossibility to provide a main preload reactor winding having an infinite impedance when little or no control current is present, it is seen that a certain amount of current will flow through the circuit including both main reactor windings 62 and 64, in the case of the lower leg, and main preload reactor windings 162 and 164. Accordingly, this current may be utilized as a biasing current for the main reactor winding 62, 64 and the magnetic core magnetically coupled therewith. Thus in the situation where current is flowing through the winding 30 from the bottom to top, a path is completed through conductor 40 and diode circuit 148 to the positive bus 54.

Similarly, a second shunt current path is provided through preload reactor winding 164, conductor 174, the second preload reactor winding 162 through the main reactor winding 62 in a direction from left to right through the winding 62 and through the main reactor 64 in a direction from right to left through this latter winding. It will be seen that this current is in the proper direction to reset the core in the negative half cycle reactor winding 62 thereby obviating the necessity for a bias current for the core. Similarly, on the opposite half cycle of the core which was utilized in the immediately preceding cycle is reset by the opposite flow of current through the respective main reactor winding 62 to 72.

Referring now to FIGURE 2, there is illustrated a control circuit 200 which controls the amount of current being fed to the preload reactor control windings 180, 182, 184 by means of a pair of conductors 202 and 204. A suitable adjustable current limit resistor 206 is provided in series circuit with each of the windings 180, 182, 184 to provide control of the limits of the current being fed to the windings 180 to 184. The control circuit generally comprises a current, voltage and reference sensing circuit 210, which is connected in controlling relation with a plurality of windings included in a magnetic firing circuit 212. The operation of the circuit is controlled in response to the conditions sensed by the sensing circuit 210 and the operation of the magnetic firing package 212 is utilized in controlling the conductive condition of a back-to-back silicon controlled rectifier (SCR) circuit 214.

The output of the SCR circuit 214 is rectified by means of a rectifier circuit 216, the output of which is connected in controlling relation with the output conductor 202 and 204. Thus the conditions at the load circuit are sensed by means of sensing circuit 210 and the control signals generated in response to the sensed conditions are fed to the magnetic firing package 212. These control signals control the operation of the magnetic firing circuit 212 to control the gate signal being fed to the SCR circuit 214. In this manner, the output current on conductors 202 and 204 are controlled in response to the sensed conditions as sensed by sensing circuit 210.

Referring now to the sensing circuit 210, a plurality of load circuit conditions are sensed and a plurality of control signals are generated therein to control the operation of the firing circuit 212. Specifically, a transductor circuit 220 (FIGURE 1) is connected in current sensing relation to a calibrated bus bar 222 wherein a direct current signal proportional to the current flowing in the bus 54 is produced on output conductors 224 and 226. As is common in the art, the alternating current supply for the transductor circuit 220 is provided by means of a transformer 228 having a secondary winding 230 connected in series therewith. The transductor circuit 220 is of the type commonly used in providing a direct current voltage in response to current flowing in the bus.

The variation in current in conductors 224 and 226 is fed to a bridge circuit 234 by means of conductors 236 and 238 wherein the alternating current potential across the conductors 236, 238 is rectified by the bridge 234 and impressed on output conductors 240, 242. This direct current potential is impressed across a voltage divider resistor 244 which is made variable to provide adjustment of the amount of output signal being provided from the bridge circuit 234. The current sensitive output signal from the bridge 234 is fed through a current limiting resistor 248 and a conductor 250 and a second conductor 252 to the firing circuit 212, specifically to a pair of series connected control windings 258 and 260 connected across conductors 250 and 252. The operation of these windings 258, 260 will be described in more detail in conjunction with the description of the firing circuit 212.

The voltage across the output buses is fed, for voltage sensing purposes, to the sensing circuit 210 by means of a pair of conductors 264 and 266 and specifically is fed to a voltage divider resistor 270 by means of the conductors 252, 242 and 272 at one end thereof and a conductor 274 connected to the other end. The output of the voltage divider resistor 270 is fed through a slider 276 and a current limit resistor 278 to an output conductor 280 and the other side of the voltage sensing resistor 270 is fed to an output conductor 282. The conductors 280 and 282 are connected to a voltage responsive control winding 286 in the firing circuit 212, also for a purpose to be more fully explained hereinafter.

In a similar manner, the reference circuit signal is impressed on sensing circuit 210 by means of input conductors 290, 292 which receive an output signal from the automatic voltage and current control circuit 100 by means of a cable 294. The reference signal may be a voltage which is developed in accordance with the reference potential being utilized to control the automatic voltage and current control circuit. As is common in the art, the output voltage or the output current is compared to a reference signal and an error signal is generated within the automatic voltage and current control circuit 100 to control the operation of the main reactor winding 62 to 72. The particular setting of this reference signal is sensed within the automatic voltage and current control circuit 100 and an output control signal, indicative of the setting of the reference circuit, is impressed on the cable 294 and thence to the sensing circuit 210 by means of the conductors 290 and 292.

One side of the reference signal is fed to the upper end of a reference voltage divider resistor 300 by means of conductors 292, 266, 282 and 274 and the other end of the resistor 300 is connected directly to the input conductor 290 by means of a conductor 302. Thus a voltage is developed across resistor 300 which varies in accordance with the setting of the reference circuit within the automatic voltage and current control circuit 100. A portion of this reference potential across resistor 300 is fed, through a slider 310 and a current limit resistor 312, to the reference control winding 314 contained in firing circuit 212 by means of a conductor 316 connected at one end of resistor 312 and a conductor 318 connected to common conductor 282.

From the foregoing it is seen that a control signal is fed to each of a plurality of control windings, for example current control winding 258 and 260, voltage control winding 286 and reference control winding 314, the current through which varies in accordance with the amount of current flowing in the load circuit, the voltage across the load circuit and the particular setting of the reference circuit within the automatic voltage and current control circuit 100, respectively. The signals in the windings 258, 260, 286 and 314 are such as to provide a cumulative affect, i.e., as you either increase the current or increase the voltage in the load circuit, the amount of current flowing through the windings 258 and 260 and 286, respectively, will rise and similarly as the reference potential is raised, the amount of current flowing in the reference control winding 314 will increase as will be seen from the remaining description of the circuitry.

As stated above, the greater the impedance of the preload windings 162 to 172, the less the amount of preload current which is absorbed in the preload circuit or passed through the preload windings. Accordingly, to decrease the preload current it is only necessary to increase the amount of current flowing in windings 258, 260, due to a rise in current, or to increase the amount of current flowing in winding 286, due to an increase in voltage, or to increase the amount of current flowing in winding 314, due to an increase in the reference level.

In looking at the reference winding 314, it is seen that by raising the reference level the current in winding 314 will increase thereby decreasing the preload. However, with the raising of the reference level, the amount of current or voltage in the circuit is also raised, depending on which is being controlled, therefore raising the current in windings 258 and 260 or winding 286. Thus, the preload is further reduced and the effect becomes accumulative, up to a point in the operation of the firing circuit 212. The identical situation is true when the reference potential is lowered, thereby lowering the current in winding 314. In this situation, the preload is increased to a certain degree, and the preload is further increased when the voltage or current is correspondingly lowered due to the lowering of the reference potential.

Referring now to the firing circuit 212, there is illustrated a conventional firing circuit which may be utilized in providing controlled firing signals for use in SCR circuits wherein the firing point of the SCRs may be advanced or retarded in response to control signals being fed to the firing circuit 212. Such a firing circuit may be of the type sold by Magnetics, Inc. and the particular circuit illustrated is of the type wherein a zero current in windings 258, 260, 286 and 314 provides full output from the firing circuit 212. At this point, the SCRs are fired substantially immediately at the beginning of each cycle.

The firing circuit 212 includes an input transformer having a primary winding 330 which receives alternating current electrical energy from a plurality of input conductors 332, 334 connected to a source at conductors 336, 338. The transformer 330 is coupled to a pulse transformer circuit 340 which includes a pair of saturable reactor windings 342, 344 to provide current about a path including the windings 342 and 344 and the primary windings 346, 348 of the pulse transformer. The current through the transformer windings 346, 348 is suitably rectified by means of a diode 350. The control windings 258, 260, 286 and 314 are magnetically coupled to the saturable reactor windings 342 and 344 to control the saturation of the core magnetically associated therewith.

Thus a plurality of output pulses will be produced at a secondary winding 354, 356 which is advanced or retarded in phase in response to the amount of current flowing through the windings 358, 360, 386 and 314. The secondary windings 354 and 356 are connected to the SCR control circuit 214 by means of conductors 360, 362 and 364, 366, respectively, these latter conductors being connected across the gate-cathode circuits of a pair of silicon controlled rectifiers 370, 372. The silicon controlled rectifiers 370 and 372 are connected in back-to-back relation to provide full wave control of the current flowing through the SCRs 370, 372.

The main current supply for the SCRs 370, 372 is supplied from the alternating current supply, at conductors 336 and 338, by means of a series circuit which includes conductors 362, 366 connected to conductors 338, this latter conductor 362 being connected to the cathode of SCR 370 and the anode of SCR 372. The opposite electrode of the SCRs 370, 372 is connected to the rectifier circuit 216 and specifically a bridge circuit 380 by means of a conductor 382. The bridge completes the circuit to the source of alternating current potential by means of a conductor 384 and a second conductor 386. Thus the source of alternating current potential flows from conductor 338 to conductor 362, through the SCR back-to-back combination in circuit 214, through the conductor 382, the input nodes of the bridge 380, the conductor 384 and the conductor 386. The output from the bridge is fed to the output conductors 202 and 204 by means of conductors 390 and 392, thereby providing the current being controlled by SCRs 370 and 372 to the preload reactor control windings 180, 182 and 184.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a reactor controlled power supply circuit having output terminals and a load, a source of alternating current, a power transformer having a primary winding connected to the source of alternating current and a secondary winding, a control saturable reactor including a controlled winding connected to said secondary winding, and a shunt saturable reactor for loading said control saturable reactor when the load across said output terminals is minimized, said shunt reactor having a controlled winding shunting said output terminals and a controlling winding responsive to electrical condition in the controlled winding of said control saturable reactor to preload said control reactor upon the occurrence of a relatively small load across said terminals.

2. The system of claim 1 further including a control reactor control circuit for controlling the operation of the control reactor and a shunt reactor control circuit for controlling the operation of said controlling winding, said control circuit including first means responsive to load conditions of the power supply and second means responsive to preselected conditions in said control reactor control circuit for providing a control signal to said controlling winding.

3. The system of claim 2 wherein said first means includes current means for producing a current control signal in response to load current and voltage means for producing a voltage control signal in response to load voltage.

4. The system of claim 3 wherein said control circuit further includes correlating means for correlating the output signals from said current, voltage and condition means and producing control signals in response thereto.

5. The system of claim 4 further including controlled rectifying means interconnected between said controlling winding and said correlating means for controlling the current supplied to said controlling winding in response to said control signals.

6. The system of claim 5 wherein said controlled rectifying means is a silicon controlled rectifier and said correlating means is a firing circuit for the gate circuit of said silicon controlled rectifier.

7. The system of claim 1 wherein the biasing current for said control saturable reactor is supplied by a path through said shunt saturable reactor.

8. In a reactor controlled power supply circuit having output terminals and a load, a source of alternating current, a condition control circuit for preselecting conditions in the power supply circuit, a control saturable reactor controlled in response to said condition control circuit including an alternating current winding operatively associated with said source of alternating current coupled in controlled relation with said control saturable reactor, a shunt saturable reactor for loading said control saturable reactor when the load across said output terminals is minimized, said shunt reactor having a saturable core, an alternating current winding on the core and shunting said output terminals, a DC winding on the core, means for controlling the DC winding to automatically decrease the reactance of said shunt reactor and increase the reactance of said control reactor, respectively, said means including current means for sensing the load current through said output terminals, voltage means for sensing the voltage across said output terminals, and condition means sensing the preselected conditions of said condition control circuit, and means correlating said current means, voltage means and condition means.

9. The power supply circuit of claim 8 wherein said condition means includes reference level means for controlling one of the voltage and current at the output terminals.

10. The power supply circuit of claim 9 wherein a rise in one of said voltage, current and condition causes an increase in the reactance of the said shunt saturable reactor and said condition responsive means is the primary control of said shunt saturable reactor during said minimal load conditions.

References Cited

UNITED STATES PATENTS

| | | | |
|---|---|---|---|
| 2,714,188 | 7/1955 | Scherer | 323—66 |
| 3,210,637 | 10/1965 | Gams | 321—18 |
| 3,237,083 | 2/1966 | Williams | 321—25 |

JOHN F. COUCH, *Primary Examiner.*

WARREN E. RAY, *Examiner.*